J. T. GRAVES.
Seed Planter.
No. 108,349.
Patented Oct. 18, 1870.
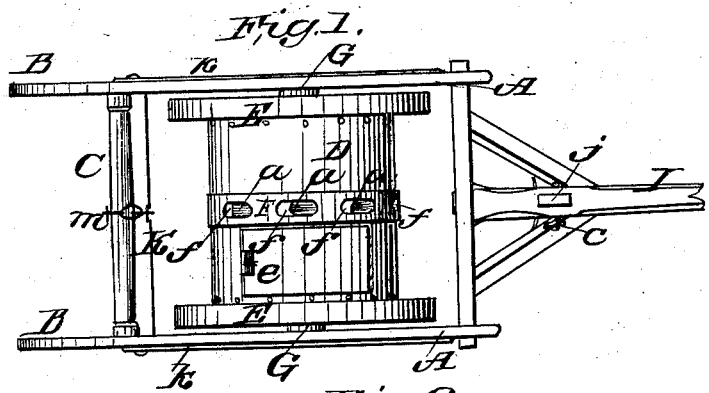
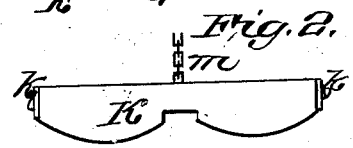
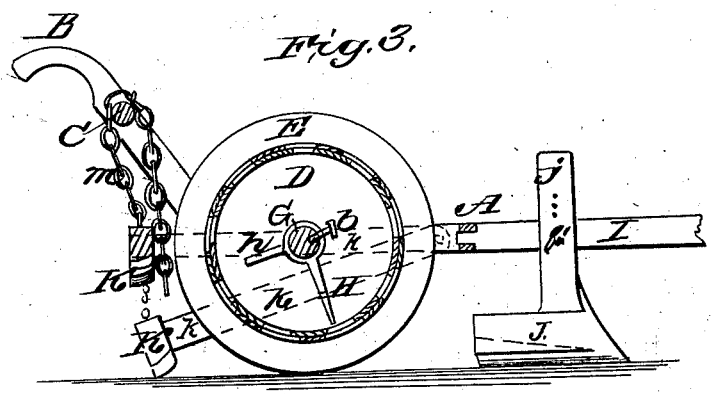
Witnesses:
Chas H. Poole
Wm. J. Ketcham
Inventor:
James T. Graves
By J. B. Weedm'ff & Son
Attorneys

United States Patent Office.

JAMES T. GRAVES, OF WILSON, NORTH CAROLINA.

Letters Patent No. 108,349, dated October 18, 1870.

IMPROVEMENT IN COTTON-SEED AND GUANO-DISTRIBUTERS.

The Schedule referred to in these Letters Patent and making part of the same

*To all whom it may concern:*

Be it known that I, JAMES T. GRAVES, of Wilson, in the county of Wilson and State of North Carolina, have invented certain new and useful Improvements in a Cotton-Seed and Guano Distributer; and the following is a full, clear, and exact description of the same, reference being had to the accompanying drawing making a part of this specification, in which—

Figure 1 represents a plan or top view of the implement or machine.

Figure 2 shows an adjustable scraper or drag, to be let down in the rear of the cylindrical distributer, for covering the fertilizer.

Figure 3 is a sectional side view of the implement, showing the plan or opening device as attached to the beam, the interior of the cylindrical distributer, with the paddles or spoons to stir up the seed or guano, so as to keep it constantly discharging.

My invention relates to an agricultural implement, very much required, to facilitate the raising of cotton, corn, and other productions of the South which are planted in rows, so that the weeds can be scraped off the surface to near the young and tender plants in the early stages of their growth, and afterward cultivated with modern improved cultivators.

My invention consists in the form and construction of the adjustable point, or shallow opening device, to receive the seed or fertilizers in rows, as it is let out of the elongated openings which surround the central portion of the revolving distributer, and the arrangement of the adjustable scraper or drag to be let down in the rear, for covering the discharged substance, when desired; also, in the arrangement of one or more adjustable arms, with a blade or spoon-point, the same being secured to the stationary shaft which the cylindrical distributer turns on, for the purpose of stirring up the seed, and pulverizing any lumps in the guano or other fertilizers that may be put in for distribution.

To enable others to make and use my improvements in seed and fertilizer-distributers, I will describe them more in detail, referring to the drawing and to the letters marked thereon.

The frame A should be substantially made of timber; the handles B B elevated to a convenient height, and connected together by a roll or bar, C, in the rear of the cylindrical receiver D, which is made of sheet metal, and secured centrally between the wheels E E, whose diameter is about one-third larger than the cylinder D, which is provided with an opening in one side sufficiently large to put in the substances to be distributed, the opening being closed by a hinged door, $d$, and secured by a button-fastening, $e$.

Around the central portion of the cylinder D there is a series of elongated openings, $a\ a\ a$, at regular intervals, to let out the seed and fertilizers in hills, and also a sliding band, F, provided with corresponding openings, $f\ f\ f$, to close up or adjust the size of the openings $a\ a\ a$ to let out the desired quantity of seed, &c.

The axle or shaft G, on which the cylinder D revolves, is secured stationary in the sides of the frame A A; and on the shaft G is fitted and secured, by set-screw $b$, one or more arms or spoon-blades H, to stir up the seed, and break up any lumps of guano or other fertilizing substance, so that it will discharge evenly and freely at the openings $a\ a\ a$.

To the beam I is attached the plow or shallow opening device J, which is so constructed as to scrape any irregularities from the surface, and at the same time scoop out a smooth channel for the seed and fertilizers, the depth being regulated by the pin $i$ in the standard $j$ in the beam I.

A scraper, K, attached to side-bars $k\ k$, pivoted to the frame A, and suspended to the bar $c$ by a chain, $m$, may be let down in the rear of the distributer D, to drag and cover the substances deposited in the groove or channel made by the device J.

What I claim, as my invention, is—

1. The plow-point or device J, constructed as shown, for forming a smooth groove or channel, in which to deposit cotton-seed, guano, or other fertilizers, and as an auxiliary for covering the same, the drag K, as shown and described.

2. The spoons or blades H, secured to the stationary shaft G, as arranged within the revolving distributer D, and in combination therewith, for operating substantially in the manner as and for the purposes herein set forth.

In testimony whereof, I hereunto subscribe my name in the presence of—

JAMES T. GRAVES.

Witnesses:
S. M. WARREN,
L. D. TOMLINSON.